(12) United States Patent
Atmaram et al.

(10) Patent No.: US 8,439,803 B2
(45) Date of Patent: May 14, 2013

(54) SYSTEM AND METHOD FOR IMPROVED CLOSED THROTTLE DOWNSHIFTS

(75) Inventors: Harinath Atmaram, Novi, MI (US); Brian H. Fiore, Farmington Hills, MI (US)

(73) Assignee: GM Global Technology Operations LLC

( * ) Notice: Subject to any disclaimer, the term of this patent is extended or adjusted under 35 U.S.C. 154(b) by 153 days.

(21) Appl. No.: 13/168,296

(22) Filed: Jun. 24, 2011

(65) Prior Publication Data

US 2012/0329604 A1 Dec. 27, 2012

(51) Int. Cl.
*F16H 61/06* (2006.01)

(52) U.S. Cl.
USPC ........................................................ 477/149

(58) Field of Classification Search ................ None
See application file for complete search history.

(56) References Cited

U.S. PATENT DOCUMENTS

| | | | | |
|---|---|---|---|---|
| 4,417,307 A | * | 11/1983 | Kubo et al. | 701/62 |
| 5,092,199 A | * | 3/1992 | Goto et al. | 477/133 |
| 5,571,060 A | * | 11/1996 | Becker et al. | 477/159 |
| 5,624,351 A | * | 4/1997 | Fujita et al. | 477/148 |
| 5,707,318 A | * | 1/1998 | Shimei et al. | 477/133 |
| 5,800,309 A | * | 9/1998 | Takiguchi et al. | 477/144 |
| 6,149,548 A | * | 11/2000 | Holbrook et al. | 477/155 |
| 7,563,198 B2 | * | 7/2009 | Ayabe et al. | 477/132 |
| 8,308,611 B2 | * | 11/2012 | Rangaraju et al. | 477/135 |
| 8,323,150 B2 | * | 12/2012 | Atmaram et al. | 477/133 |

OTHER PUBLICATIONS

U.S. Appl. No. 12/851,672, filed Aug. 6, 2010, Harianth Atmaram et al.

* cited by examiner

*Primary Examiner* — Dirk Wright

(57) ABSTRACT

A control system for a transmission coupled to an engine includes first, second, and third modules. The first module detects a closed throttle downshift of the transmission. The second module detects a request for a power-on downshift of the transmission. The third module controls a clutch of the transmission when the request for the power-on downshift is detected during the closed throttle downshift, wherein the third module one of (i) decreases a pressure applied to the clutch to a first predetermined pressure before an end of the closed throttle downshift and (ii) controls a pressure applied to the clutch to a second predetermined pressure at the end of the closed throttle downshift.

20 Claims, 6 Drawing Sheets

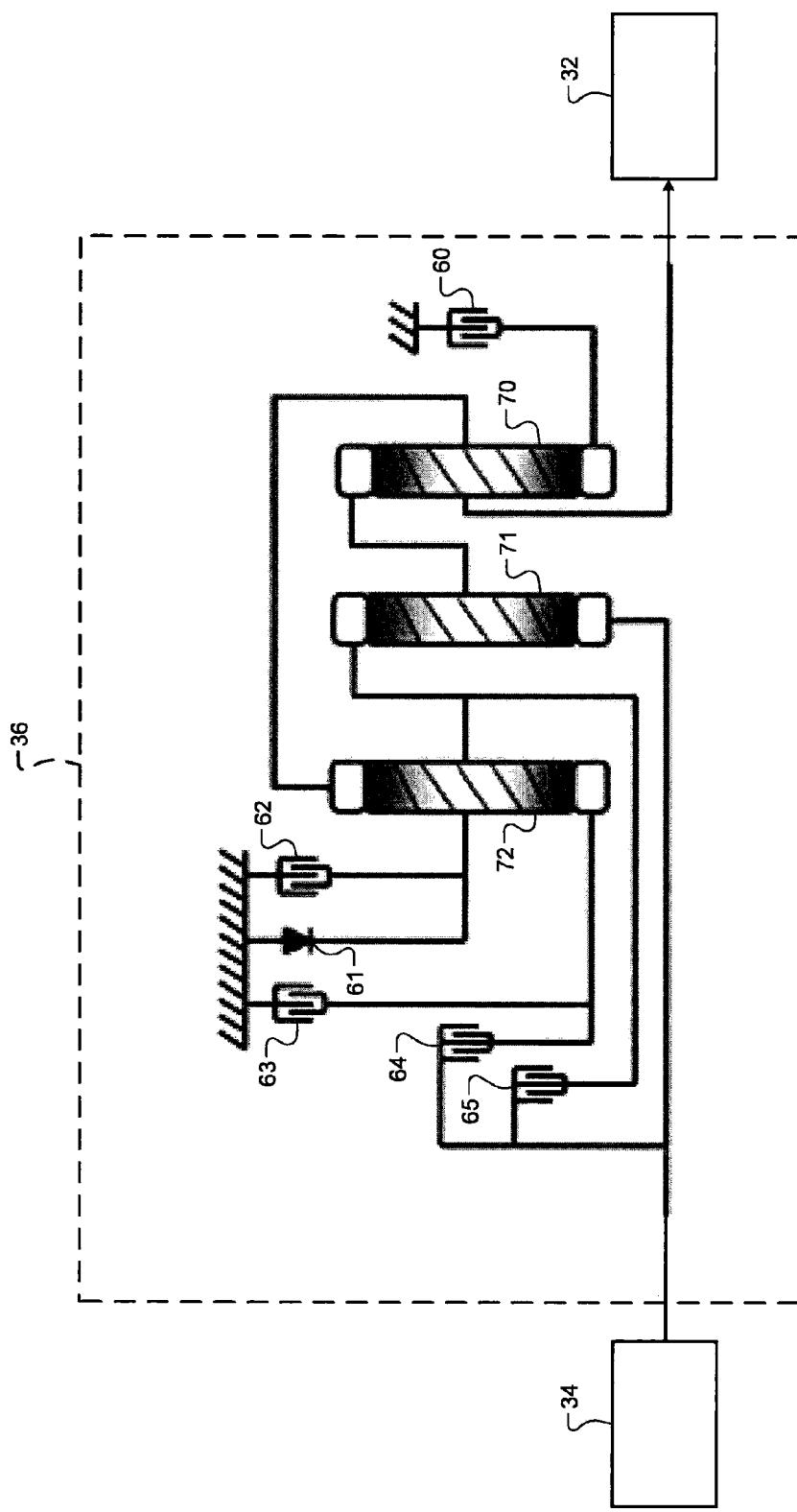

SYSTEM AND METHOD FOR IMPROVED CLOSED THROTTLE DOWNSHIFTS

FIELD

The present disclosure relates to transmission control systems and more particularly to a system and method for improved closed throttle downshifts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft and generate drive torque. The drive torque is transferred from the crankshaft to a driveline of a vehicle via a transmission. The transmission may include a plurality of different gear ratios for translating the drive torque at the crankshaft to a desired drive torque at the vehicle driveline. A control system may shift between the plurality of gear ratios of the transmission based on operating parameters such as engine speed/load and vehicle speed. A downshift refers to a shift operation from a higher gear ratio to a lower gear ratio. For example, a closed throttle downshift may occur during a period when a throttle is closed. A power-on downshift, on the other hand, refers to a downshift operation when a driver of the vehicle is requesting additional power (e.g., via the throttle).

SUMMARY

A control system for a transmission coupled to an engine includes first, second, and third modules. The first module detects a closed throttle downshift of the transmission. The second module detects a request for a power-on downshift of the transmission. The third module controls a clutch of the transmission when the request for the power-on downshift is detected during the closed throttle downshift, wherein the third module one of (i) decreases a pressure applied to the clutch to a first predetermined pressure before an end of the closed throttle downshift and (ii) controls a pressure applied to the clutch to a second predetermined pressure at the end of the closed throttle downshift.

A method for controlling a transmission coupled to an engine includes detecting a closed throttle downshift of the transmission, detecting a request for a power-on downshift of the transmission, and controlling a clutch of the transmission when the request for the power-on downshift is detected during the closed throttle downshift, wherein controlling the clutch of the transmission includes one of (i) decreasing a pressure applied to the clutch to a first predetermined pressure before an end of the closed throttle downshift and (ii) controlling a pressure applied to the clutch to a second predetermined pressure at the end of the closed throttle downshift.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A is a schematic of an example six-speed automatic transmission according to one implementation of the present disclosure;

DETAILED DESCRIPTION

Figure 1:
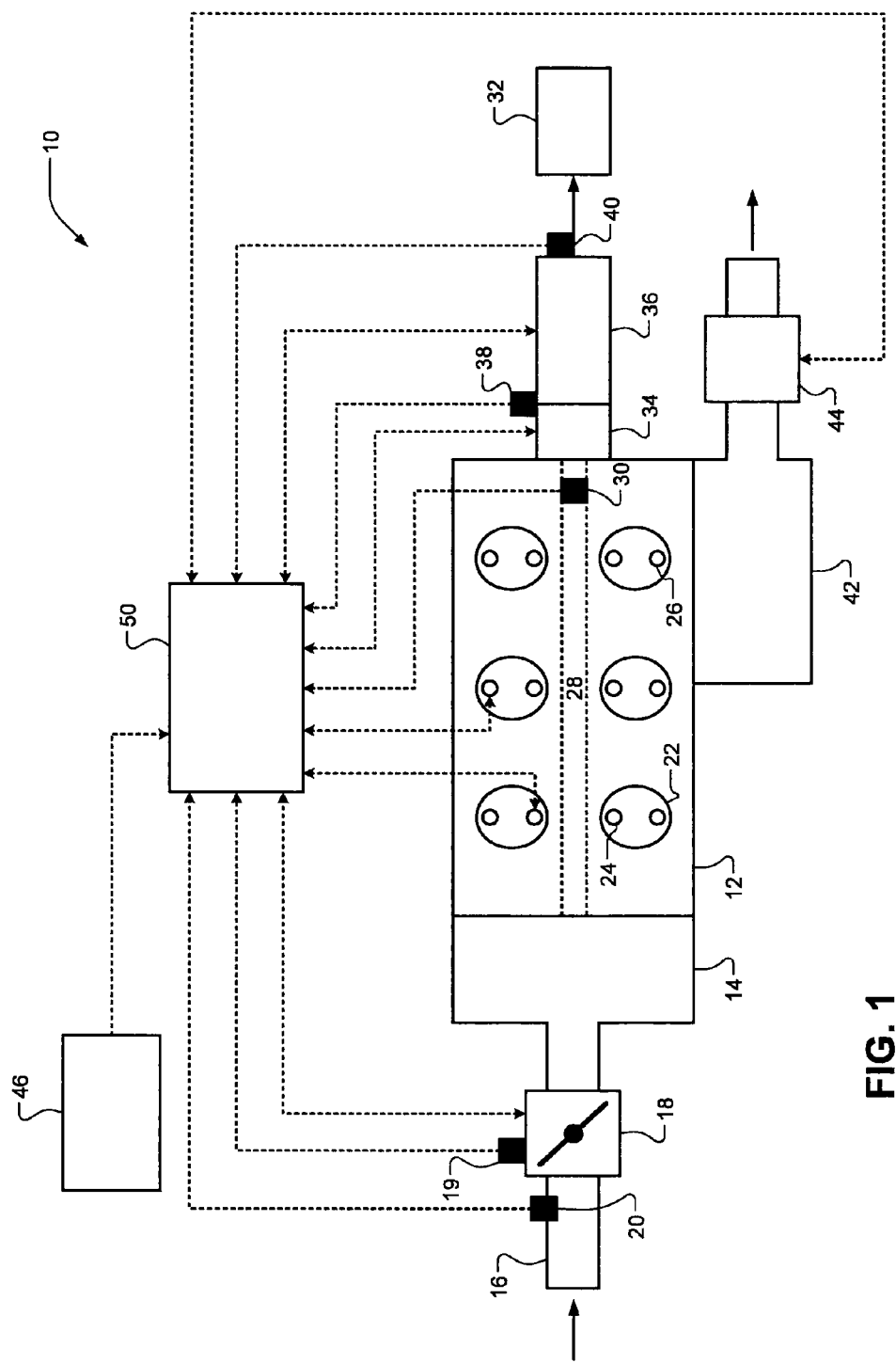
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Closed throttle downshifts refer to downshifts of a transmission during a period when a throttle is closed. For example, a control system may downshift the transmission because the vehicle slows down during the period when the throttle is closed. During a closed throttle downshift, however, a driver may request additional power via the throttle (i.e., opening, or "tip in" of the throttle). In other words, two separate shift operations may be requested during a period: the closed throttle downshift and a power-on downshift.

Conventional control systems may perform these two shift operations sequentially with a delay period in between. This delay increases shift response time and may increase noise, vibration, and/or harshness (NVH) for the driver. Alternatively, conventional control systems may perform skip-via-neutral shift during which holding clutches are released, the transmission is placed in a neutral state, and the clutches for the desired gear ratio are then applied. Requesting acceleration (i.e., a power-on downshift) during a skip-via-neutral shift, however, may also decrease shift performance (e.g., due to a resulting torque hole).

Accordingly, a system and method for improved closed throttle downshifts are presented. The system and method may control a clutch of a transmission during or at an end of a closed throttle downshift to improve shift time and shift smoothness of a following power-on downshift. For example, the power-on downshift may be started at or before a turbine speed of the closed throttle downshift reaches synchronization. In this regard, the second downshift is a skip-at-sync downshift. A skip-at-sync downshift occurs when a transmission "skips" from a first downshift to a second downshift at synchronization of the first downshift. Synchronization occurs when a measured turbine speed is equal to an estimated turbine speed at a commanded gear ratio.

Specifically, the system and method may first determine whether a closed throttle downshift is occurring. The system and method may then detect whether a power-on downshift is requested. When a power-on downshift is requested during a closed throttle downshift, the system and method may (i) ramp off pressure applied to a holding to off-going clutch before the end of the closed throttle downshift or (ii) control a pressure applied to an on-coming to off-going clutch to a predetermined pressure that is less than a maximum desired clutch pressure. After controlling the holding to off-going or on-coming to off-going clutch, the system and method may then perform the requested power-on downshift operation.

Referring now to FIG. 1, an example engine system 10 includes an engine 12. The engine 12 may be a spark ignition (SI) engine, a diesel engine, a homogeneous charge compression ignition (HCCI) engine, or another suitable type of engine. The engine system 10 may also be a hybrid system and therefore may include additional components such as an electric motor and a battery system.

The engine 12 draws air into an intake manifold 14 through an induction system 16 that may be regulated by a throttle 18. For example, the throttle 18 may be electrically controlled via electronic throttle control (ETC). A throttle position sensor (TPS) 19 measures a position of the throttle 18. A mass air flow (MAF) sensor 20 measures MAF through the throttle 18. For example, the measured MAF may indicate a load on the engine 12. The air in the intake manifold 14 is distributed to a plurality of cylinders 22 and combined with fuel to create an air/fuel (A/F) mixture. While six cylinders are shown, the engine 12 may have other numbers of cylinders.

Fuel injectors 24 may inject the fuel to create the A/F mixture. For example, the fuel injectors 24 may inject the fuel into intake ports of the cylinders 22, respectively, or directly into the cylinders 22, respectively. The A/F mixture is compressed by pistons (not shown) within the cylinders 22. Depending on the type of engine 12, spark plugs 26 may ignite the compressed A/F mixture. Alternatively, the A/F mixture may be compressed until auto-ignition occurs. The combustion of the A/F mixture within the cylinders drives the pistons (not shown) which rotatably turn a crankshaft 28 and generate drive torque. An engine speed sensor 30 measures a rotational speed of the crankshaft 28 (e.g., in revolutions per minute, or RPM).

The drive torque at the crankshaft 28 is transferred to a driveline 32 of a vehicle via a transmission 36. For example, the transmission 36 may be coupled to the crankshaft 28 via a fluid coupling such as a torque converter (TC) 34. The transmission 36 includes a plurality of gear ratios for translating the drive torque at the output of the torque converter 34 (i.e., an input shaft of the transmission 36) to a desired drive torque at the driveline 32 (i.e., at an output shaft of the transmission 36). The transmission 36 may be any suitable type of transmission including two or more clutches (i.e., capable of (i) on-coming to off-going clutch transitions and (ii) holding to off-going clutch transitions).

A transmission input shaft speed (TISS) sensor 38 measures a rotational speed of an input shaft of the transmission 36 (i.e., the rotational speed at the output of the torque converter 34). A transmission output shaft speed (TOSS) sensor 40 measures a rotational speed of an output shaft of the transmission 36 (i.e., the rotational speed of the vehicle driveline 32). For example, the measured TOSS may be used to determine a speed of the vehicle. Alternatively, however, another suitable sensor (e.g., a wheel speed sensor) may measure the speed of the vehicle.

Exhaust gas resulting from combustion is expelled from the cylinders 22 into an exhaust manifold 42. The exhaust gas in the exhaust manifold 42 may be treated by an exhaust treatment system 44 before being released into the atmosphere. For example, the exhaust treatment system 44 may include at least one of an oxidation catalyst (OC), nitrogen oxide (NOx) adsorbers/absorbers, a lean NOx trap, a selective catalytic reduction (SCR) system, a particulate matter (PM) filter, and a three-way catalytic converter. A driver input module 46 translates input from the driver of the vehicle (e.g., via an accelerator pedal) for a control module 50.

The control module 50 controls operation of the engine system 10. The control module 50 may receive signals from the throttle 18, the MAF sensor 20, the fuel injectors 24, the spark plugs 26, the engine speed sensor 30, the torque converter 34, the transmission 36, the TISS sensor 38, the TOSS sensor 40, the exhaust treatment system 44, and/or the driver input module 46. The control module 50 may control the throttle 18, the fuel injectors 24, the spark plugs 26, the torque converter 34, the transmission 36, and/or the exhaust treatment system 44. The control module 50 may also implement the system or method of the present disclosure.

Referring now to FIG. 2A, a first example of the transmission 36 is shown. Specifically, FIG. 2A illustrates a six-speed automatic transmission. As previously described, the transmission 36 transfers drive torque from the torque converter 34 to the driveline 32. The transmission 36 includes six clutches 60, 61, 62, 63, 64, and 65, respectively, and three gears 70, 71, and 72, respectively. For example only, gear 70 may have a lower gear ratio than gears 71 and 72, and gear 71 may have a lower gear ratio than gear 72. The transmission 36 may also include other components such as, for example only, ring gears, sun gears, carrier gears, servos, etc. The control module 50 selectively engages or disengages one or more of the clutches 60-65 to engage/disengage one or more of the gears 70-72 thereby achieving a desired gear ratio for translating input torque (from torque converter 34) to output torque (to driveline 32).

Clutch 60 may also be referred to as clutch F1 or a freewheeler clutch. The freewheeler clutch 60 allows the transmission 36 to achieve a first gear ratio (i.e., gear 70) by engaging clutch 61. Clutch 61 may also be referred to as clutch CB1234 because clutch 61 is engaged to achieve each of gear ratios corresponding to gears 1, 2, 3, and 4. In addition, clutch 61 is also a braking clutch as denoted by the B in CB1234. Clutch 62 may also be referred to as clutch CBLR because clutch 62 is engaged to achieve a gear ratio corresponding to a reverse (R) gear. Clutch 63 may also be referred to as clutch CB26 because clutch 63 is engaged to achieve each of gear ratios corresponding to gears 2 and 6. Clutch 64 may also be referred to as clutch C35R because clutch 64 is engaged to achieve each of gear ratios corresponding to gears 3, 5, and R. Lastly, clutch 65 may also be referred to as clutch C456 because clutch 65 is engaged to achieve each of gear ratios corresponding to gears 4, 5, and 6.

Figure 2B:
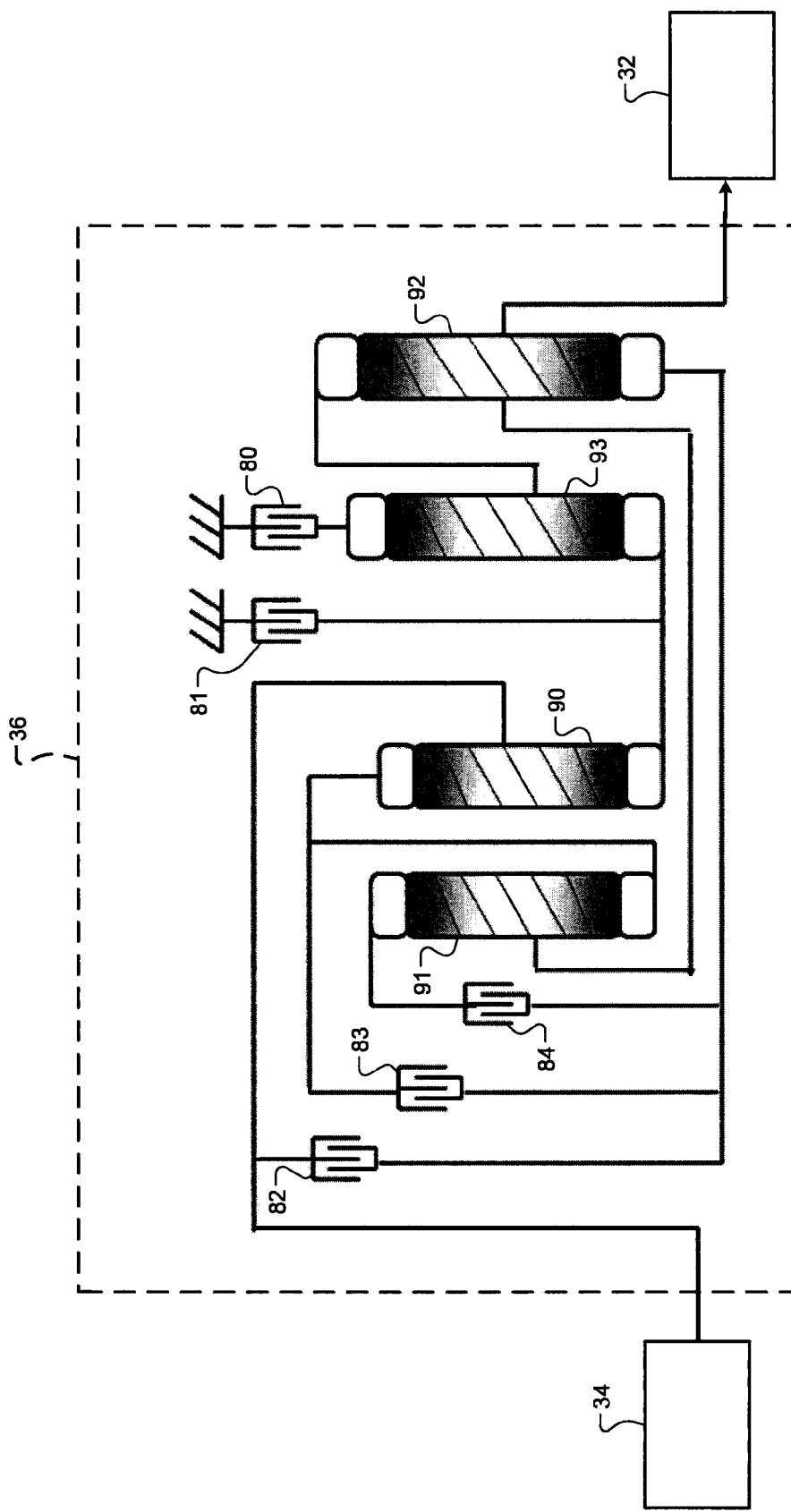
FIG. 2B is a schematic of an example eight-speed automatic transmission according to one implementation of the present disclosure.

Referring now to FIG. 2B, a second example of the transmission 36 is shown. Specifically, FIG. 2B illustrates an eight-speed automatic transmission. As previously described, the transmission 36 transfers drive torque from the torque converter 34 to the driveline 32. The transmission 36 includes five clutches 80, 81, 82, 83, and 84, respectively, and four gears 90, 91, 92, and 93, respectively. For example only, gears 90-93 may have relative gear ratios as follows (from smallest to largest): 90, 91, 92, 93. The transmission 36 may also include other components such as, for example only, ring gears, sun gears, carrier gears, servos, etc. The control module 50 selectively engages or disengages one or more of the clutches 80-84 to engage/disengage one or more of the gears 90-93 thereby achieving a desired gear ratio for translating input torque (from torque converter 34) to output torque (to driveline 32).

Clutch 80 may also be referred to as clutch CB12345R because clutch 80 is engaged to achieve each of gear ratios corresponding to gears 1, 2, 3, 4, 5, and R. In addition, clutch 80 is also a braking clutch as denoted by the B in CB12345R. Clutch 81 may also be referred to as clutch CB1278R because clutch 81 is engaged to achieve each of gear ratios corresponding to gears 1, 2, 7, 8, and R. Clutch 82 may also be referred to as clutch C13567 because clutch 82 is engaged to achieve each of gear ratios corresponding to gears 1, 3, 5, 6, and 7. Clutch 83 may also be referred to as clutch C23468 because clutch 83 is engaged to achieve each of gear ratios corresponding to gears 2, 3, 4, 6, and 8. Lastly, clutch 84 may also be referred to as clutch C45678 because clutch 84 is engaged to achieve each of gear ratios corresponding to gears 4, 5, 6, 7, and 8.

While a six-speed automatic transmission and an eight-speed automatic transmission are shown in FIGS. 2A and 2B, respectively, and described above, the system and method may be implemented for other suitable transmissions. For example, the transmission 36 may be another type of transmission (e.g., a dual clutch transmission, or DCT). In addition, for example, the transmission 36 may include other numbers of gears (e.g., a five-speed automatic transmission, a seven-speed automatic transmission, etc.). In other words, the system and method can be implemented for transmissions having at least two clutches which are therefore capable of (i) on-coming to off-going transitions and (ii) holding to off-going transitions.

Figure 3:
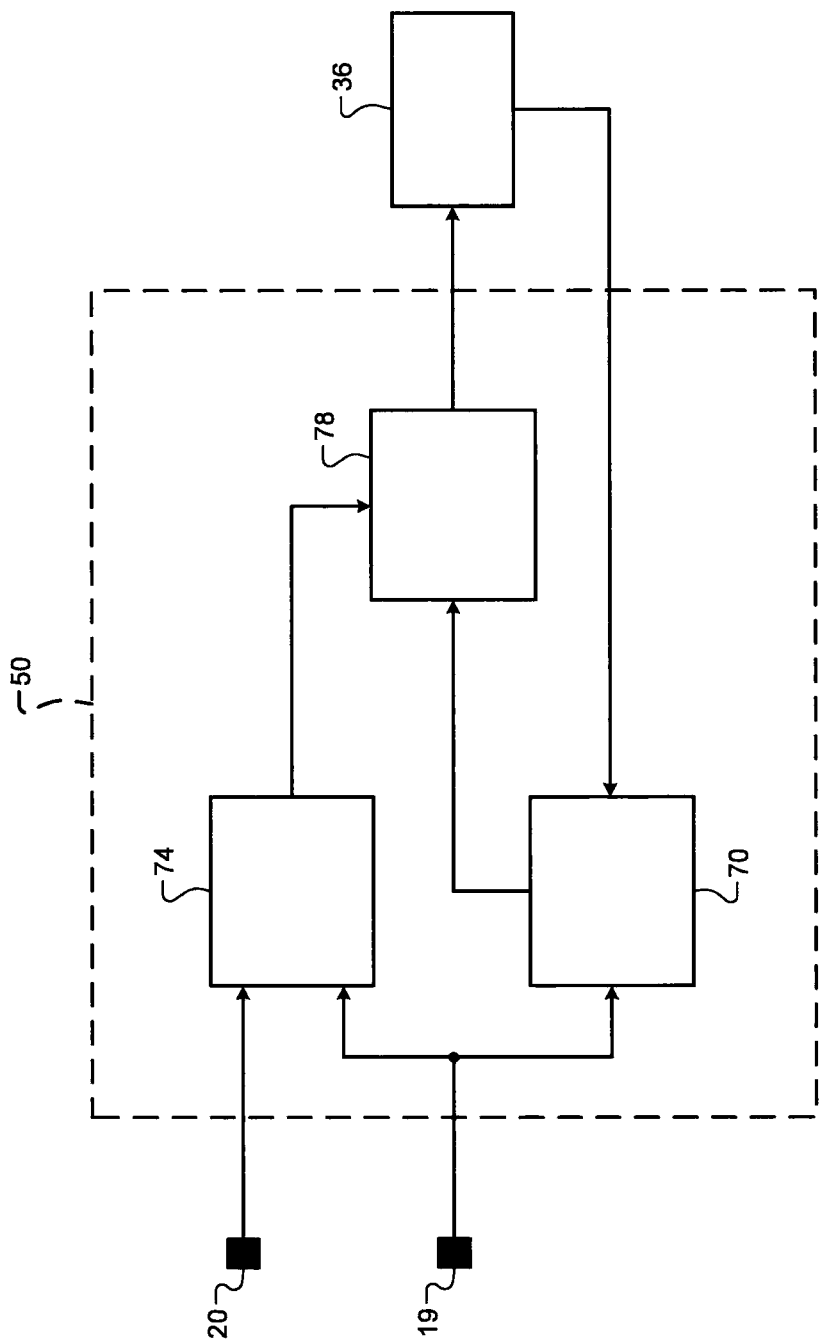
FIG. 3 is a functional block diagram of a control module according to one implementation of the present disclosure.

Referring now to FIG. 3, an example of the control module 50 is shown. The control module 50 may include a closed throttle downshift (CTD) detection module 70, a power-on downshift (PD) request detection module 74, and a clutch control module 78.

The CTD detection module 70 detects closed throttle downshifts of the transmission 36. Specifically, the CTD detection module 70 may detect a closed throttle downshift when (i) the throttle is closed and (ii) the transmission 36 is performing a downshift operation. For example, the CTD detection module 70 may detect when the throttle 18 is closed based on measurements from the TPS 19. In addition, for example, the CTD detection module 70 may detect when the transmission 36 is downshifting based on operating parameters of the transmission 36 (e.g., clutch pressures). The CTD detection module 70, however, may also detect when the transmission 36 is downshifting based on other engine and/or transmission operating parameters. The CTD detection module 70 may generate a signal to notify the clutch control module 78 when a closed throttle downshift is occurring.

The PD request detection module 74 detects whether a power downshift is requested. Specifically, the PD request detection module 74 may detect a request for a power downshift based on driver input 46 (e.g., tip-in of the accelerator pedal). The PD request detection module 74, however, may also detect the request for the power downshift based on other engine operating parameters such as engine load and/or throttle position (measured by MAF sensor 20 and TPS 19, respectively). The PD request detection module 74 may generate a signal to notify the clutch control module 78 when a power downshift is requested.

The clutch control module 78 controls the transmission 36 by selectively engaging/disengaging various clutches of the transmission 36. The clutch control module 78 may also receive the signals generated by the CTD detection module 70 and/or the PD request detection module 74. When both signals are received (indicating a power downshift is requested during a closed throttle downshift), the clutch control module 78 may effectively start the power downshift before the closed throttle downshift ends. Specifically, the clutch control module 78 may start the power downshift by either (i) controlling a holding clutch during a holding to off-going clutch transition or (ii) controlling an on-coming clutch during an on-coming to off-going clutch transition.

For example only, in a six-speed automatic transmission (as shown in FIG. 2A and previously described), holding to off-going clutch transitions include the following gear shifts: 653, 643, 642, 641, 621, 543, 542, 541, 532, and 531 (e.g., 531 indicates a closed throttle downshift from $5^{th}$ gear to $3^{rd}$ gear and a power downshift from $3^{rd}$ gear to $1^{st}$ gear). Additionally, for example only, in the six-speed automatic transmission example, on-coming to off-going clutch transitions include the following gear shifts: 654, 432, 431, 421, and 321. Holding to off-going and on-coming to off-going clutch transitions may also be similarly defined for an eight-speed automatic transmission (as shown in FIG. 2B and described above) and/or for other suitable speed transmission and transmission types (e.g., seven-speed automatic transmissions, DCTs, etc.).

Figure 4A:
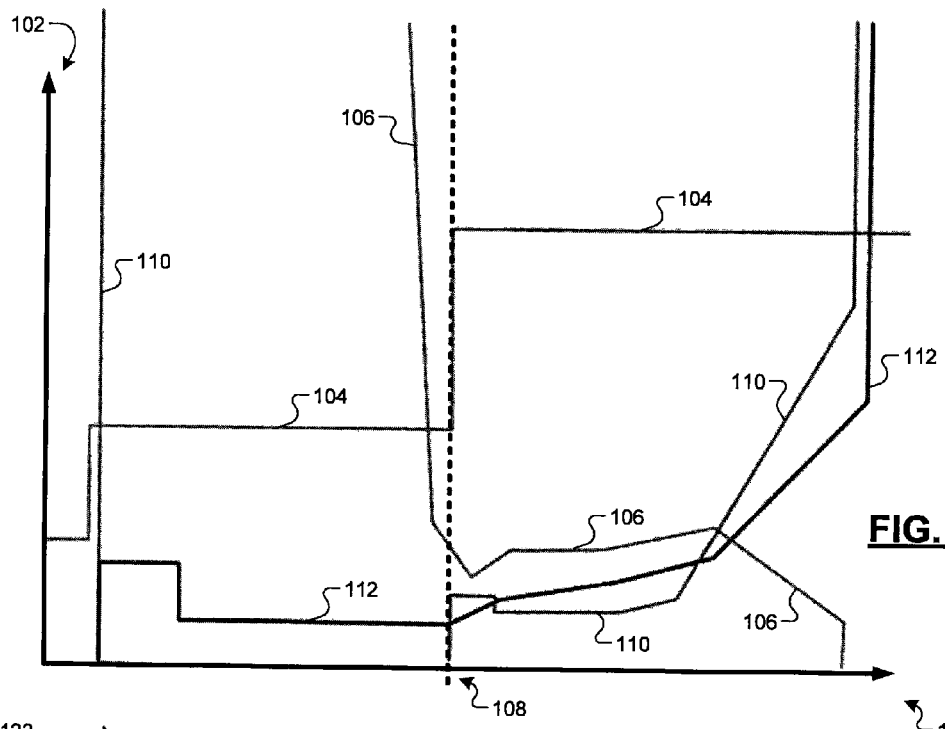
FIGS. 4A-4B are graphs illustrating simulated clutch pressure control during closed throttle and power-on downshifts according to various implementations of the present disclosure.

FIG. 4A illustrates a simulated holding to off-going clutch transition. Horizontal axis 100 represents time and vertical axis 102 represents clutch pressure. Clutch 110 is ramped off at the start of a closed throttle downshift (indicated by a first increase in commanded gear turbine speed 104). Before the end of the closed throttle downshift (indicated by 108), holding clutch 106 begins to ramp to a first predetermined pressure. For example only, the first predetermined pressure may be approximately zero. The first predetermined pressure, however, may be another suitable pressure greater than zero. The power-on downshift is then performed after 108 by ramping on of clutches 110 and 112. The early ramping off of the holding clutch 106 decreases shift time and improves shift smoothness.

For example only, FIG. 4A may illustrate a holding to off-going clutch transition of a 543 downshift (i.e., closed throttle downshift from $5^{th}$ gear to $4^{th}$ gear, and a power-on downshift from $4^{th}$ gear to $3^{rd}$ gear). Therefore, clutch 110 may be clutch C35R, holding clutch 106 may be clutch C456, and on-coming clutch 112 may be clutch C1234 (see FIG. 2A and its corresponding description above). Additionally, for example only, the period before the end of the closed throttle downshift at which the power downshift starts (i.e., the holding clutch 106 begins ramping off) may be either predetermined or based on engine/transmission operating parameters.

Figure 4B:
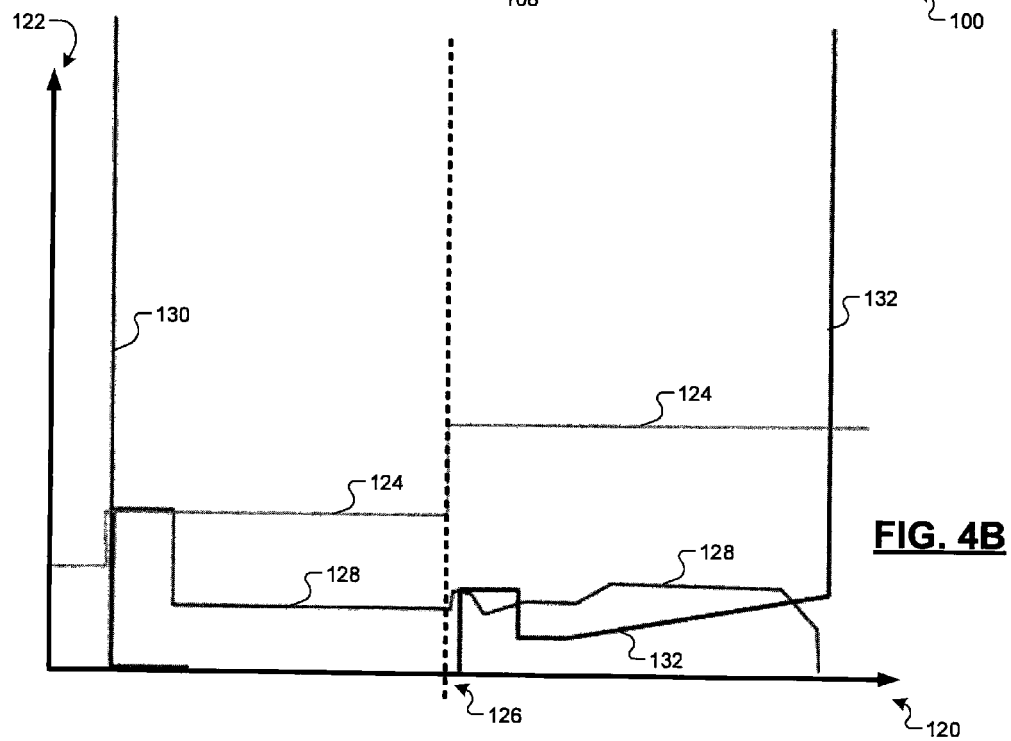

FIG. 4B, on the other hand, illustrates a simulated on-coming to off-going clutch transition. Horizontal axis 120 represents time and vertical axis 122 represents clutch pressure. Clutch 130 is ramped off at a start of a closed throttle downshift (indicated by a first increase in commanded gear turbine speed 124). At an end of the closed throttle downshift (indicated by 126), the pressure applied to the on-coming clutch 128 is increased to a second predetermined pressure. For example only, the second predetermined pressure is less than a maximum desired pressure (i.e., a full on clutch pressure). In other words, the pressure applied to the on-coming clutch 128 is prevented from reaching the maximum desired pressure at the end of the closed throttle downshift (indicated by 126). The power-on downshift is then performed after 126 by ramping on on-coming clutch 132. Preventing the on-coming clutch 128 from reaching the maximum clutch pressure also decreases shift time and improves shift smoothness.

For example only, FIG. 4B may illustrate an on-coming to off-going clutch transition of a 654 downshift (i.e., closed throttle downshift from $6^{th}$ gear to $5^{th}$ gear, and a power-on downshift from $5^{th}$ gear to $4^{th}$ gear). Therefore, clutch 130 may be clutch CB26, on-coming to off-going clutch 128 may be clutch C35R, and on-coming clutch 132 may be clutch C1234 (see FIG. 2B and its corresponding description above). Additionally, for example only, the pressure applied to the on-coming clutch 128 at the end of the closed throttle downshift may be either predetermined or based on engine/transmission operating parameters.

Figure 5:
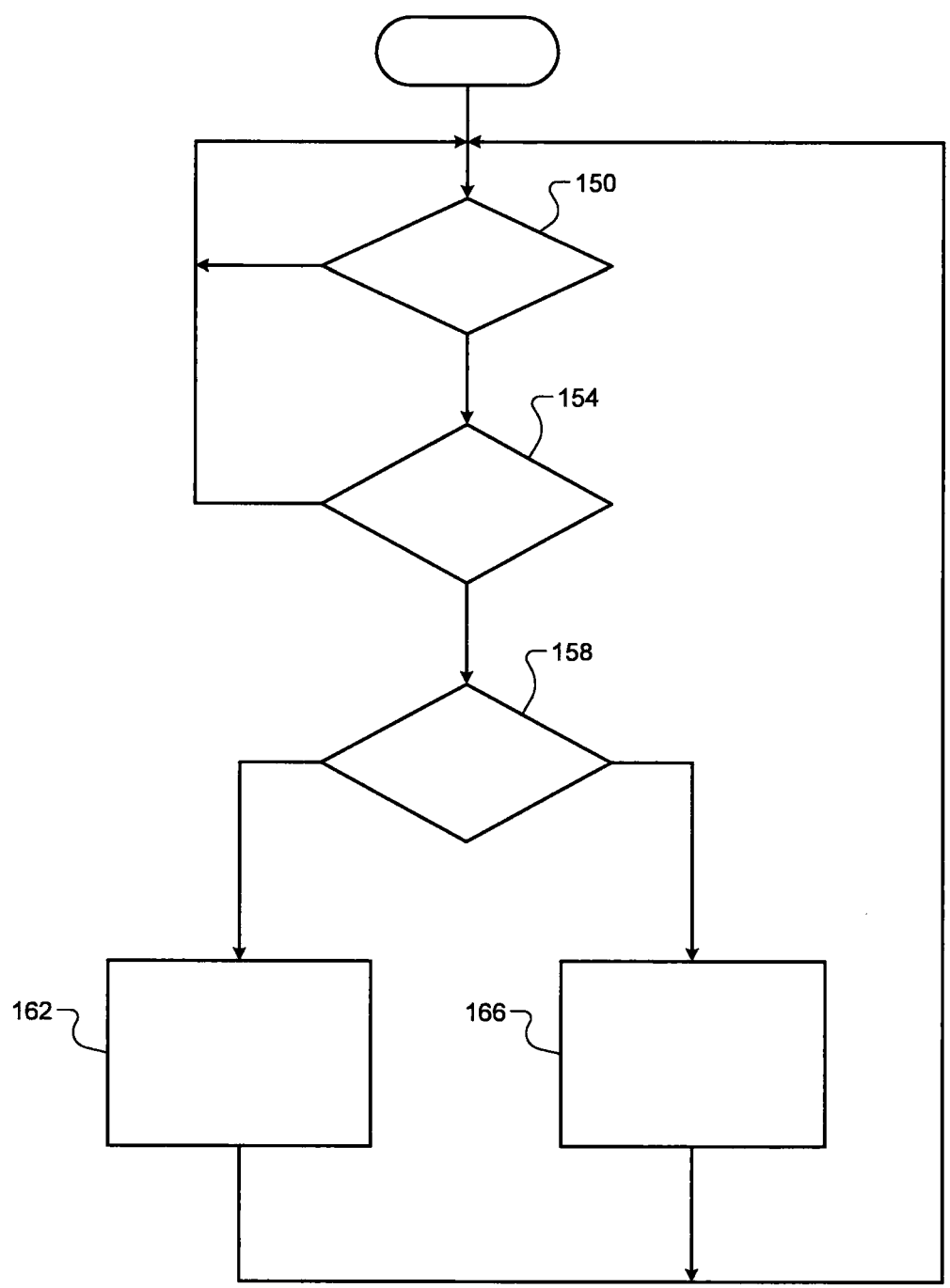
FIG. 5 is a flow diagram illustrating an example method for improved closed throttle downshifts according to one implementation of the present disclosure.

Referring now to FIG. 5, an example method for improved closed throttle downshifts begins at 150. At 150, the control module 50 determines whether a closed throttle downshift is occurring. If true, control may proceed to 154. If false, control may return to 150. At 154, the control module 50 determines whether a power-on downshift has been requested. If true, control may proceed to 158. If false, control may return to 150. At 158, the control module 50 determines whether a holding to off-going clutch transition is occurring. If true, control may proceed to 162. If false (i.e., an on-coming to off-going clutch transition is occurring), control may proceed to 166. At 162, the control module 50 may start ramping off the holding clutch before the end of the closed throttle downshift, and the control module 150 may then perform the power-on downshift. Control may then return to 150. At 166, the control module 50 may prevent the on-coming to off-going clutch from reaching the maximum desired clutch pressure at the end of the closed throttle downshift, and the control module 50 may then perform the power-on downshift. Control may then return to 150.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a transmission coupled to an engine, the control system comprising:
    a first module that detects a closed throttle downshift of the transmission;
    a second module that detects a request for a power-on downshift of the transmission; and
    a third module that controls a clutch of the transmission when the request for the power-on downshift is detected during the closed throttle downshift, wherein the third module one of (i) decreases a pressure applied to the clutch to a first predetermined pressure before an end of the closed throttle downshift and (ii) controls a pressure applied to the clutch to a second predetermined pressure at the end of the closed throttle downshift.

2. The control system of claim 1, wherein the clutch is a holding clutch transitioning to an off-going clutch, and wherein the third module starts decreasing the pressure applied to the holding clutch to the first predetermined pressure before the end of the closed throttle downshift.

3. The control system of claim 2, wherein the first predetermined pressure is approximately zero.

4. The control system of claim 1, wherein the clutch is an on-coming clutch transitioning to an off-going clutch, and wherein the third module controls the pressure applied to the on-coming clutch to the second predetermined pressure at the end of the closed throttle downshift.

5. The control system of claim 4, wherein second predetermined pressure is less than a maximum desired pressure for the closed throttle downshift.

6. The control system of claim 5, wherein the third module prevents the pressure applied to the on-coming clutch at the end of the closed throttle downshift from reaching the maximum desired pressure.

7. The control system of claim 1, wherein the transmission is one of a six-speed automatic transmission and an eight-speed automatic transmission.

8. The control system of claim 1, wherein the first module detects the closed throttle downshift when (i) a throttle of the engine is closed and (ii) the transmission is performing a downshift operation.

9. The control system of claim 1, wherein the second module detects the request for the power-on downshift based on driver input.

10. The control system of claim 1, wherein the second module detects the request for the power-on downshift based on at least one of mass air flow (MAF) into the engine and engine throttle position.

11. A method for controlling a transmission coupled to an engine, the method comprising:
    detecting a closed throttle downshift of the transmission;
    detecting a request for a power-on downshift of the transmission; and
    controlling a clutch of the transmission when the request for the power-on downshift is detected during the closed throttle downshift, wherein controlling the clutch of the transmission includes one of (i) decreasing a pressure applied to the clutch to a first predetermined pressure before an end of the closed throttle downshift and (ii) controlling a pressure applied to the clutch to a second predetermined pressure at the end of the closed throttle downshift.

12. The method of claim 11, wherein the clutch is a holding clutch transitioning to an off-going clutch, and further comprising starting the decreasing of the pressure applied to the holding clutch to the first predetermined pressure before the end of the closed throttle downshift.

13. The method of claim 12, wherein the first predetermined pressure is approximately zero.

14. The method of claim 11, wherein the clutch is an on-coming clutch transitioning to an off-going clutch, and further comprising controlling the pressure applied to the on-coming clutch to the second predetermined pressure at the end of the closed throttle downshift.

15. The method of claim 14, wherein second predetermined pressure is less than a maximum desired pressure for the closed throttle downshift.

16. The method of claim 15, further comprising preventing the pressure applied to the on-coming clutch at the end of the closed throttle downshift from reaching the maximum desired pressure.

17. The method of claim 11, wherein the transmission is one of a six-speed automatic transmission and an eight-speed automatic transmission.

18. The method of claim 11, further comprising detecting the closed throttle downshift when (i) a throttle of the engine is closed and (ii) the transmission is performing a downshift operation.

19. The method of claim 11, further comprising detecting the request for the power-on downshift based on driver input.

20. The method of claim 11, further comprising detecting the request for the power-on downshift based on at least one of mass air flow (MAF) into the engine and engine throttle position.

\* \* \* \* \*